July 14, 1936.  E. B. ANDERSON  2,047,660
UNIVERSAL JOINT
Filed June 25, 1935  2 Sheets-Sheet 1
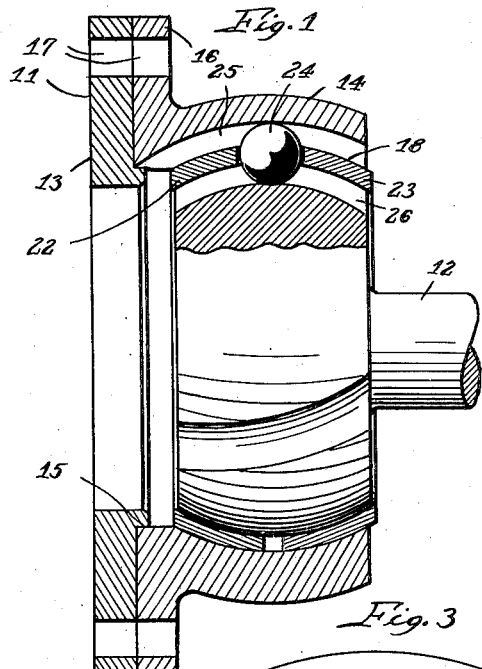
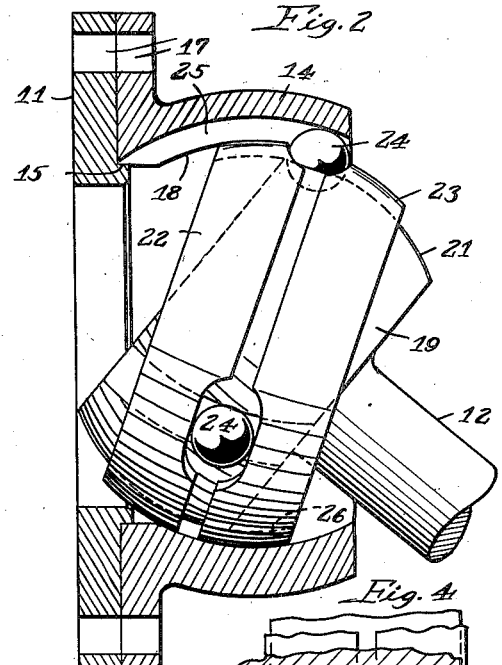
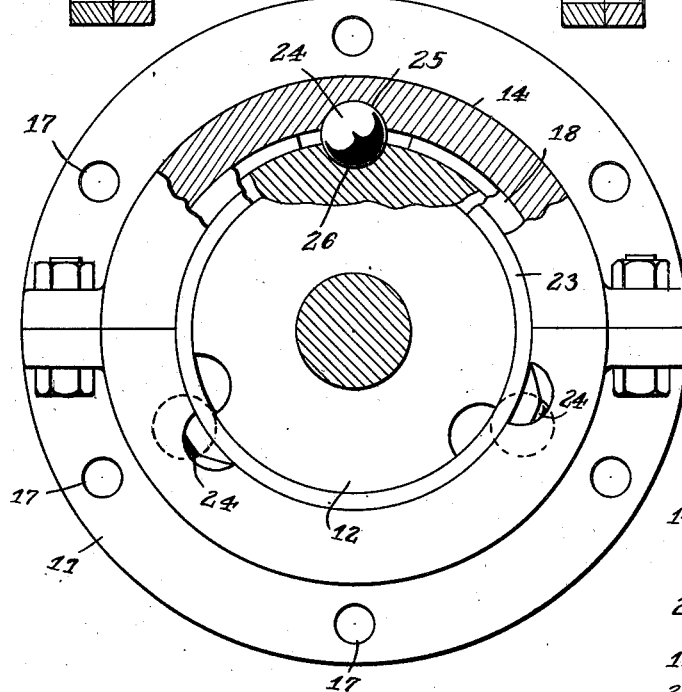
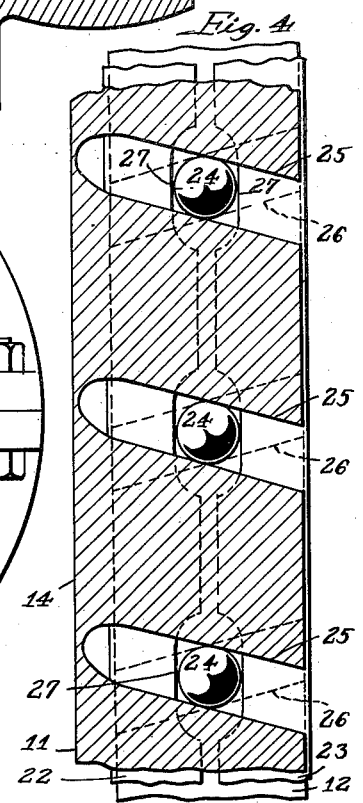
Inventor:
Edmund B. Anderson
By Wilson, Bowell, McCanna & Wintercorn
Attys.

July 14, 1936.　　E. B. ANDERSON　　2,047,660
UNIVERSAL JOINT
Filed June 25, 1935　　2 Sheets-Sheet 2
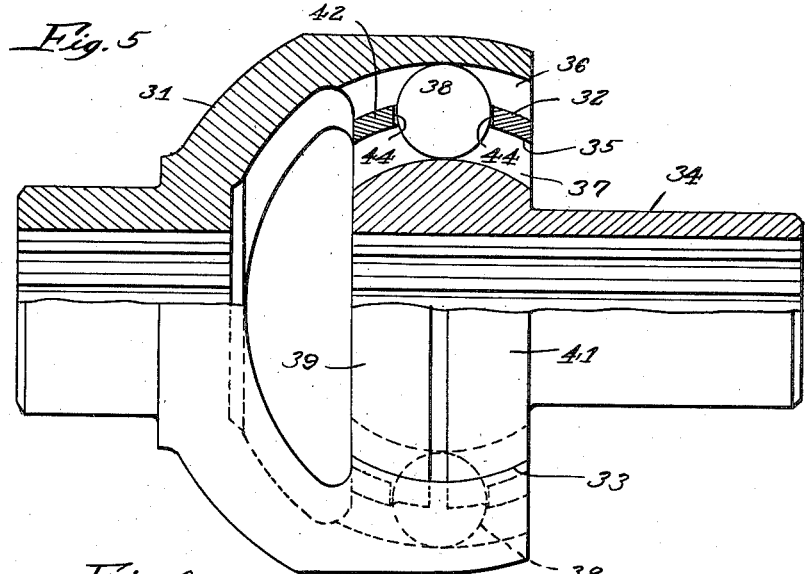
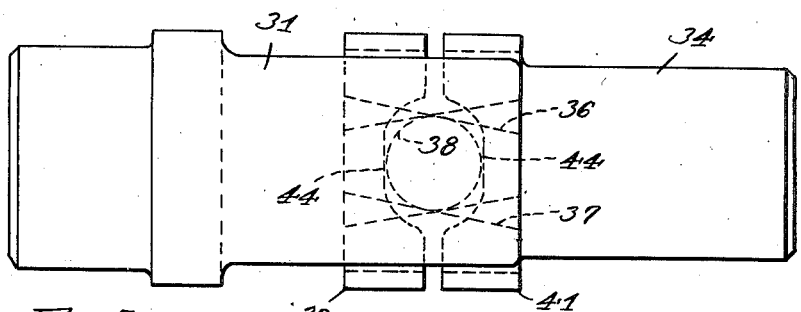
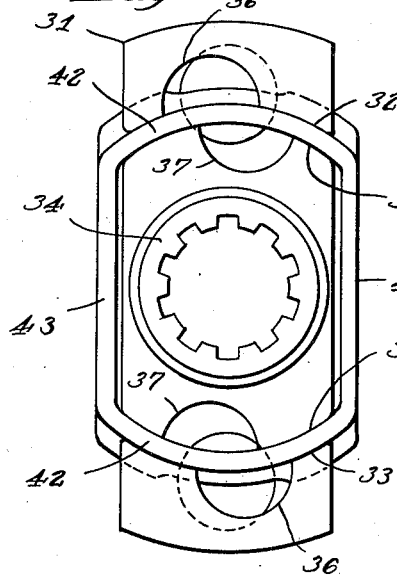
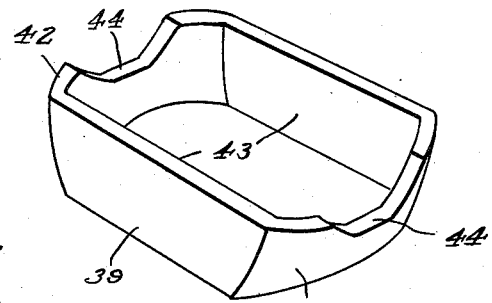

Patented July 14, 1936

2,047,660

UNITED STATES PATENT OFFICE 2,047,660

UNIVERSAL JOINT

Edmund E. Anderson, Rockford, Ill., assignor of one-third to Milton B. Anderson and one-third to Carl E. Swenson, both of Rockford, Ill.

Application June 25, 1935, Serial No. 28,323

11 Claims. (Cl. 64—21)

This invention relates to universal joints of the constant velocity type.

In this type of universal joints the angular velocities of the two connected shafts are equal at all times as distinguished from universal joints in which the angular velocity of the driven shaft is constantly varying when running at an angle with respect to the driving shaft. This variation in angular velocity is not seriously objectionable where the running angle is slight but it is decidedly inimical to installations where the angle may be great. For example, while universal joints of the varying velocity type are quite generally used in the propeller shaft drive of motor vehicles where the running angle is small, they cannot be used in front wheel drives and some types of four wheel drives where greater angularity is required. Furthermore, constant velocity universal joints would be desirable for many applications, particularly in the automobile industry where the trend in design is toward greater flexibility in the running gear to provide improved riding comfort under all road conditions. However, such universal joints have not been popular in the automobile industry generally because of their high cost necessitated by extreme precision requirements in their manufacture.

The primary object of the present invention is, therefore, to provide a universal joint of the constant velocity type involving a new and improved principle of operation. According to my invention, driving balls interposed between the driving and driven members are positively controlled so that each ball transmits an equal share of the load irrespective of moderate inaccuracies in manufacture. Furthermore, greater economy in cost of production is obtained because this new construction enables the use of less costly methods of manufacture. For example, compared with prior constant velocity universal joints, extreme accuracy is not required in machining the ball grooves or raceways in order to have proper registration of the balls in the raceways. This is due primarily to the novel combination of raceways, balls and retainers, in which each ball automatically finds a center of operation irrespective of variations or inaccuracies in manufacture within comparatively liberal tolerances. Another feature contributing to low cost is the construction of the ball retainers which may be formed mainly by stamping, as distinguished from precision machining operations.

A further object is to provide improved features of the character described adaptable for application to constant velocity universal joints designed for both wide and narrow ranges of running angularity; in other words, adapted for such installations as in front wheel drives requiring a wide range of angularity between the driving and driven members and also for application to propeller shaft drives usually requiring a much smaller range of angularity.

Other objects and attendant advantages will be appreciated by those skilled in this art as the invention becomes better understood by reference to the following description when considered in connection with the accompanying drawings, in which—

Figure 1 is a vertical section longitudinally of a universal joint embodying my invention, with the driving and driven members in axial alignment and the inner member partly in elevation;

Fig. 2 is a similar section with the inner member moved to an extreme angularity and this member, as well as the ball retainers, shown in elevation;

Fig. 3 is a view looking at the right hand end of Figure 1, partly broken away in vertical transverse section;

Fig. 4 is a diagrammatic development illustrating arrangement of the crossed raceways, the drive transmitting balls and the ball retainers;

Fig. 5 is a vertical section partly in elevation of a modified form of universal joint embodying my invention;

Figs. 6 and 7 are top and end views, respectively, of Fig. 5, and

Fig. 8 is a perspective view of one of the ball retainers used in the modified form.

My invention deals primarily with the construction and principle of operation of the parts which transmit the driving torque between the driving and driven members at constant velocity at all relative angular positions of the driving member with respect to the driven member. It follows, therefore, that aside from the essential characteristics involved in the torque transmitting means, the driving and driven members may be of any suitable or preferred construction. The construction of such members would, of course, vary according to the particular application of the universal joint. The form shown in Figures 1–4, inclusive, is of a type adapted for relatively great angularity between the driving and driven members, in keeping with the requirements for front wheel drives for motor vehicles, four wheel drives for trucks, and any torque transmitting train where there is considerable angularity. The form shown in Figs. 5–8, inclusive, illustrates the invention as applied to a universal joint having a lesser degree of angularity, as, for example, in what is known as a Hotchkiss drive for motor vehicles.

Referring to Figure 1, the driving and driven members are designated generally by the reference characters 11 and 12. The driving member in this instance is made up of an annular plate 13 and a spherical member 14 centered on a flange 15 on the member 13 and having a radial flange 16 adapted to be secured to the member 11 by bolts (not shown) passing through holes 17. These bolts would also serve to connect the driving member to a companion flange of the adjacent drive transmitting part.

The driving member 14 has an internal spherical surface 18 and the driven member 12 has a body portion 19 located within the enclosure of the driving member and having an external spherical surface 21 concentric with the surface 18 but on a shorter radius so as to leave an intervening space for reception of the ball retaining means.

In the present form of the invention, the ball retaining means consists of ring members 22 and 23 of spherical formation fitting the space between the spherical surfaces 18 and 21 of the driving and driven members and serving to support and center the driven member 21 within the driving member 14.

The driving torque is transmitted through the means of balls and raceways interposed between the driving and driven members 14 and 19. In the form herein illustrated, three balls 24 are used, each ball being located in opposed grooves or raceways in the spherical surfaces 18 and 21. The grooves 25 in the driving member 14 have a lead in a clockwise direction, viewing Fig. 4 from the right, and are parallel one with respect to the other. The grooves 26 in the driven member 21 have a lead in the opposite direction, that is, counterclockwise viewing Fig. 4 from the right, and are likewise parallel one with respect to the other. These grooves are equally spaced circumferentially and, therefore, the grooves in the driving member will cross the grooves in the driven member, as shown in the development view, and a drive transmitting ball 24 is located in each set or pair of complemental grooves at the intersection thereof formed by the crossed relation. The balls are retained in approximately a common plane by means of the retaining rings 22—23, each of which has faces 27 retaining the balls against displacement endwise in the raceways and taking a limited amount of thrust according to the direction of rotation of the driving member. The balls, by virtue of their engagement in the opposed raceways, will serve to transmit driving torque from the driving to the driven member and vice versa at any angularity of one such member with respect to the other. When the driving and driven parts are in coaxial alignment, as shown in Figure 1, the balls are at rest in the raceways when transmitting driving torque and when the driving and driven members are in angular relation as, for example, as shown in Fig. 2, the balls having constant rolling action in the raceways as they traverse the raceways lengthwise thereof by reason of their controlled position under the influence of the retaining rings. It will also be observed that each ball is automatically centered between the oppositely inclined raceways at the intersection thereof and that, as a consequence of this construction each ball takes its equal share of the load. This principle of operation is particularly advantageous because it obviates undue friction between the torque transmitting parts and insures free rolling action of the balls. It provides for self-centering of the consequence of this construction, each ball takes its equal share of the load. This principle of operation is particularly advantageous because it obviates undue friction between the torque transmitting parts and insures free rolling action of the balls. It provides for self-centering of the balls in the respective sets of raceways, together with equal distribution of the torque load regardless of irregularities or variations in machining of the raceways. In this connection, it should be noted that the opposed ball thrust faces 27 on the ring members are spaced apart a distance slightly greater than the ball diameter so as to allow for a limited tolerance as a consequence of variations in the production manufacture of parts of this kind. Thus, even though there may be a slight variation in the axial spacing of the raceway grooves or in the inclination thereof, the balls will, nevertheless, be self-centering between the opposed thrust faces of the raceways, whereas, in prior constructions employing circumferentially spaced balls, any such variations either preclude assembly of the parts because of the precision required in registration of the raceway grooves one with respect to the other, or if assembly is possible under strained conditions, there will be undue binding and wear of the balls in the raceways. My invention is further advantageous because, by reason of this combination and principle of operation, the parts may be constructed more economically and with greater tolerance for variations. In this connection, it should be noted that each raceway groove may be cut by a single milling operation, thus eliminating irregular contours and generated surfaces common in the prior art. Furthermore, the retaining rings 22—23 may be produced by coin pressed stamping operations. These rings serve to center the driving and driven members one with respect to the other and they have a suitable sliding fit between such members so that with proper lubricant there is no appreciable friction or wear between these parts. In this form of the invention, the member 14 is made in two halves bolted together, as shown in Fig. 3, for the purpose of assembly. In a six-ball construction, a sectional outer member would also be used, but, where only two drive balls are used, as in the form shown in Fig. 5, a sectional outer member is not required. In the form shown in Figure 1, no means is provided for limiting angularity, it being considered that the driving and driven members when in use are connected to operating parts having limited angularity; but any suitable means may be provided for this purpose.

The modified form shown in Figs. 5–8 is adapted for applications requiring a lesser degree of angularity, for example, not to exceed approximately 20°, although this form may be designed for greater angularity by increasing the length of the spherical bearing surfaces. In this case, the driving member 31 is in the form of a yoke having opposed internal spherical surfaces 32 and 33 corresponding with the spherical surface 18 in the first described form. The driven member 34, together with its external spherical surfaces 35 and 36, is similar to the driven member 12 and its spherical surface 21. Likewise, the outer and inner raceway grooves 36 and 37 and the drive transmitting balls 38 are similar in arrangement and function to the raceway grooves and balls above described. In this form there is also a pair of ball retainers, designated generally by 39 and 41, but instead of being annular, each retainer has opposed spherical portions 42 connected by parallel sides 43. Each spherical portion 42 has a ball contacting face 44 similar to the surfaces 27 above described. In each case, the surfaces 27 and 44 of each ring may be in one continuous surface but in the form shown the intermediate portions of the ring are extended inwardly beyond these surfaces to provide greater bearing surface between the spherical portions of the driving and driven members. In this form, the universal joint may be disassembled by tilting one of the members with respect to the other sufficiently to withdraw the balls from the raceways, thereby allowing removal of the ball and separation of the parts; and assembly is accomplished by inverse order of these steps.

I claim:

1. A torque-transmitting universal joint comprising a driving member and a driven member, one of said members having an internal spherical socket provided with a plurality of arcuate raceways extending diagonal to the axis of rotation of said member, the other member being located within said socket and having a spherical outer surface provided with a plurality of arcuate raceways complemental to the first mentioned raceways and extending diagonal to the axis of rotation of said other member but in a direction opposite from the first mentioned raceways, a drive transmitting ball in each pair of complemental raceways at the intersection thereof so that the driving torque from one member to the other is equally transmitted through the balls, and means resisting torque thrust of the balls tending to displace them lengthwise of the raceways.

2. A torque-transmitting universal joint comprising a driving member and a driven member, one of said members having internal spherical surfaces of a common center, the other member having external spherical surfaces of a common center and disposed within the spherical surfaces of the first mentioned member, a plurality of raceways in the spherical surfaces of each member, the raceways of one member having a lead in a direction opposite from the lead of the raceways of the other member, the raceways of one member being complemental to those of the other member, a driving ball in each complemental pair of raceways at the intersection thereof, and retainer means for resisting endwise thrust on the balls during the torque transmitting action.

3. A universal joint as set forth in claim 2, in which said retainer means has a sliding fit between the opposed spherical surfaces of the driving and driven members.

4. A universal joint as set forth in claim 2, in which the retainer means consists of a pair of ring members fitting between the spherical surfaces of the driving and driven members and positioned at opposite sides of the driving balls.

5. A universal joint as set forth in claim 2, in which the retainer means consists of a pair of ring members fitting between the spherical surfaces of the driving and driven members and positioned at opposite sides of the driving balls, each ring member consisting of a stamping having spherical surfaces in sliding engagement with said internal and external spherical surfaces and each having end thrust faces, the driving balls being interposed between the end thrust faces of retainer rings.

6. A torque-transmitting universal joint comprising a driving member and a driven member, said members having complemental spherical surfaces concentric with the axis of rotation, pairs of complemental ball raceway grooves in said spherical surfaces in crossed relation, a driving ball in each pair of raceway grooves at the intersection thereof, and retaining means for the driving balls.

7. A universal joint as set forth in claim 6, in which the retaining means comprises a pair of ring members of spherical section fitting between the complemental spherical surfaces of the driving and driven members, at opposite sides of the driving balls.

8. A constant velocity, torque-transmitting universal joint having a driving member and a driven member, sets of complemental raceways, the raceways being on arcs struck from a common center, one radially spaced from the other and arranged in crossed relation to the other, a drive transmitting ball interposed between the raceways of each set at the intersection thereof, the outer raceways of said sets being carried by one of said members and the inner raceways by the other, and retaining means for the balls holding them in operative relation with the raceways.

9. A constant velocity, torque-transmitting universal joint having sets of raceway grooves spaced circumferentially about the center, each set having an inner and an outer raceway struck from an arc concentric with said center, the raceway grooves of each set arranged in crossed relation, a drive transmitting ball interposed between the raceways of each set at the intersection joint so that each ball takes an equal share of the torque, and retainer means for the balls.

10. A torque-transmitting universal joint comprising a driving and a driven member, one member having a plurality of raceways in a spherical plane with the raceways leading in one direction, the other member having a plurality of raceways in a spherical plane within and approximately concentric with the first mentioned spherical plane and with the lead of the raceways extending in a direction opposite from that of the first mentioned raceways, the respective raceways of the inner member being in crossed relation to those of the outer member, a drive transmitting ball in each pair of crossed raceways at the intersection thereof, and means retaining the balls against displacement endwise in the raceways.

11. A universal joint as set forth in claim 10, in which the ball retaining means serves to retain the balls approximately in a plane intersecting the center from which the spherical raceways are struck but permitting a limited amount of such displacement to accommodate relative variations in the crossing points of the raceways incidental to variations in manufacture.

EDMUND B. ANDERSON.